US012469511B2

(12) United States Patent
Chen

(10) Patent No.: US 12,469,511 B2
(45) Date of Patent: Nov. 11, 2025

(54) VOICE ENHANCEMENT METHOD, APPARATUS AND SYSTEM, AND COMPUTER-READABLE STORAGE MEDIUM

(71) Applicant: GOERTEK INC., Shandong (CN)

(72) Inventor: Guoming Chen, Shandong (CN)

(73) Assignee: GOERTEK INC., Weifang (CN)

( * ) Notice: Subject to any disclaimer, the term of this patent is extended or adjusted under 35 U.S.C. 154(b) by 251 days.

(21) Appl. No.: 18/263,357

(22) PCT Filed: Jun. 30, 2021

(86) PCT No.: PCT/CN2021/103635
§ 371 (c)(1),
(2) Date: Jul. 28, 2023

(87) PCT Pub. No.: WO2022/160593
PCT Pub. Date: Aug. 4, 2022

(65) Prior Publication Data
US 2024/0079021 A1 Mar. 7, 2024

(30) Foreign Application Priority Data
Jan. 28, 2021 (CN) ......................... 202110119855.6

(51) Int. Cl.
*G10L 21/0224* (2013.01)
*G10L 21/0232* (2013.01)
*G10L 21/0308* (2013.01)

(52) U.S. Cl.
CPC ...... *G10L 21/0224* (2013.01); *G10L 21/0232* (2013.01); *G10L 21/0308* (2013.01)

(58) Field of Classification Search
CPC ............. G10L 21/0224; G10L 21/0232; G10L 21/0308; G10L 21/028; G10L 25/30;
(Continued)

(56) References Cited

U.S. PATENT DOCUMENTS 6,097,820 A * 8/2000 Turner ................ G10L 21/0208
381/94.2
9,640,179 B1 * 5/2017 Hart .................... G10L 21/0208
(Continued)

FOREIGN PATENT DOCUMENTS

CN 1622200 A 6/2005
CN 101887728 A 11/2010
(Continued)

OTHER PUBLICATIONS

International Search Report from International Application No. PCT/CN2021/103635 mailed Nov. 1, 2021.

*Primary Examiner* — Mohammad K Islam
(74) *Attorney, Agent, or Firm* — Shih IP Law Group, PLLC

(57) ABSTRACT

Disclosed are a voice enhancement method, apparatus and system and a computer-readable storage medium. The method includes acquiring a time-domain microphone signal and a time-domain bone conduction signal at the current moment; determining whether the signals are voice signals, if yes, performing a noise cancellation processing to the time-domain microphone signal by a pre-established DNN noise cancellation model, performing a frequency-domain noise cancellation processing to the time-domain bone conduction signal, if not, setting an output signal at the current moment as zero; performing a high-pass filtering processing to the time-domain microphone signal from which noise has been cancelled, to obtain a first output time-domain signal, performing a low-pass filtering processing to the time-domain bone conduction signal from which noise has been cancelled, to obtain a second output time-domain signal; obtaining an output time-domain signal at the current moment according to the first and second output time-domain signals.

10 Claims, 2 Drawing Sheets

(58) Field of Classification Search
CPC .. H04R 25/00; H04R 25/606; H04R 2225/41; H04R 2225/43; H04R 2225/61; H04R 2460/13
See application file for complete search history.

(56) References Cited

U.S. PATENT DOCUMENTS

| | | | | |
|---|---|---|---|---|
| 9,794,710 | B1 * | 10/2017 | Sheen | H04R 29/002 |
| 2003/0063759 | A1 * | 4/2003 | Brennan | H04R 3/005 381/94.2 |
| 2018/0040333 | A1 | 2/2018 | Wung et al. | |
| 2018/0165055 | A1 * | 6/2018 | Yu | H04R 27/00 |
| 2020/0074995 | A1 * | 3/2020 | Rosenberg | G10L 21/0216 |
| 2020/0357374 | A1 * | 11/2020 | Verweij | G10K 11/17827 |
| 2020/0367006 | A1 * | 11/2020 | Beckhardt | H04S 3/008 |
| 2020/0374269 | A1 * | 11/2020 | Lidman | H04L 63/10 |
| 2020/0402490 | A1 * | 12/2020 | Duthaler | H04R 1/406 |
| 2022/0310107 | A1 * | 9/2022 | Liu | G10L 25/51 |
| 2024/0055011 | A1 * | 2/2024 | Liu | H04R 1/406 |
| 2025/0014731 | A1 * | 1/2025 | Soori-Arachi | G06Q 20/065 |

FOREIGN PATENT DOCUMENTS

| | | | | | |
|---|---|---|---|---|---|
| CN | 107886967 | A | | 4/2018 | |
| CN | 109767783 | A | | 5/2019 | |
| CN | 110782912 | A | | 2/2020 | |
| CN | 110931031 | A | | 3/2020 | |
| CN | 111916101 | A | | 11/2020 | |
| CN | 112017687 | A | | 12/2020 | |
| CN | 112017696 | A | | 12/2020 | |
| CN | 112767963 | A | | 5/2021 | |
| CN | 113593612 | A | * | 11/2021 | H04R 23/00 |
| CN | 114822573 | A | * | 7/2022 | G10L 25/21 |
| EP | 3644315 | A1 | * | 4/2020 | G10L 21/0264 |

* cited by examiner

VOICE ENHANCEMENT METHOD, APPARATUS AND SYSTEM, AND COMPUTER-READABLE STORAGE MEDIUM

The present disclosure claims the priority of the Chinese Patent Application No. 202110119855.6, titled "VOICE ENHANCEMENT METHOD, APPARATUS AND SYSTEM, AND COMPUTER-READABLE STORAGE MEDIUM" filed in China Patent Office on Jan. 28, 2021, the entire contents of which are incorporated into the present disclosure by reference.

TECHNICAL FIELD

The present disclosure relates to a technical field of voice processing, in particular to a voice enhancement method, a voice enhancement apparatus and a voice enhancement system, and a computer-readable storage medium.

DESCRIPTION OF RELATED ART

Voice enhancement is an effective method to solve noise pollution, so it is widely used in civil and military occasions such as digital mobile phones, Hands-free phone systems in cars, teleconferencing and occasions for reducing background interference for hearing impaired individuals, etc. A main purpose of the voice enhancement is to extract a pure voice signal from a noisy voice signal at a receiving end as much as possible, to reduce the listening fatigue of listeners, and to improve the intelligibility.

Under normal circumstances, as shown in FIG. 1, sound waves may enter the inner ear through two paths of air conduction and bone conduction. Air conduction is a well-known method in which sound waves are transmitted from the external auditory canal to the middle ear through the auricle, and then transmitted the inner ear through the ossicular chain, which has relatively rich voice spectrum compositions. Due to the influence of environmental noise, the voice signal by air conduction is inevitably contaminated by noise.

Bone conduction refers to a method in which sound waves are transmitted to the inner ear through vibration of the skull, jaw, etc. In bone conduction, sound waves may be transmitted to the inner ear without passing through the outer ear and middle ear. A bone voiceprint sensor can only collect information that is in direct contact with a bone conduction microphone and generates vibrations. In theory, it cannot collect voice transmitted through air and is not disturbed by environmental noise, so it is very suitable for voice transmission in noisy environments. However, due to the impact of the process, the bone voiceprint sensor can only collect and transmit low-frequency voice signals, which makes the voice sound dull and affects the sound quality and user experience.

In view of the above, how to provide a voice enhancement method, a voice enhancement apparatus, a voice enhancement system, and a computer-readable storage medium that solve the above-mentioned technical problems has become a problem to be solved by those skilled in the art.

SUMMARY

An object of the present disclosure is to provide a voice enhancement method, a voice enhancement apparatus, a voice enhancement system and a computer-readable storage medium, which may make the output sound signal more pleasant, improve the sound quality, and improve user experience during use.

In order to solve the above technical problems, an embodiment of the present disclosure provides a voice enhancement method, including:

acquiring a time-domain microphone signal and a time-domain bone conduction signal at the current moment;

determining whether the time-domain microphone signal and the time-domain bone conduction signal are voice signals, if the time-domain microphone signal and the time-domain bone conduction signal are voice signals, performing a noise cancellation processing to the time-domain microphone signal by a pre-established DNN noise cancellation model so as to obtain a time-domain microphone signal from which noise has been cancelled, and performing a frequency-domain noise cancellation processing to the time-domain bone conduction signal so as to obtain a time-domain bone conduction signal from which noise has been cancelled, if the time-domain microphone signal and the time-domain bone conduction signal are not voice signals, setting an output signal at the current moment as zero;

performing a high-pass filtering processing to the time-domain microphone signal from which noise has been cancelled, so as to obtain a first output time-domain signal, and performing a low-pass filtering processing to the time-domain bone conduction signal from which noise has been cancelled, so as to obtain a second output time-domain signal; and obtaining an output time-domain signal at the current moment according to the first output time-domain signal and the second output time-domain signal.

Optionally, performing a frequency-domain noise cancellation processing to the time-domain bone conduction signal so as to obtain a time-domain bone conduction signal from which noise has been cancelled includes:

converting the time-domain bone conduction signal into a frequency-domain bone conduction signal through time-to-frequency transformation;

performing a frequency-domain noise cancellation processing to the frequency-domain bone conduction signal so as to obtain a frequency-domain bone conduction signal from which noise has been cancelled; and determining whether a bandwidth of the frequency-domain bone conduction signal from which noise has been cancelled reaches a preset bandwidth, if the bandwidth of the frequency-domain bone conduction signal from which noise has been cancelled reaches the preset bandwidth, directly performing time-to-frequency inverse transformation to the frequency-domain bone conduction signal from which noise has been cancelled so as to obtain the time-domain bone conduction signal from which noise has been cancelled, if the bandwidth of the frequency-domain bone conduction signal from which noise has been cancelled does not reach the preset bandwidth, expanding the bandwidth of the frequency-domain bone conduction signal from which noise has been cancelled by using a pre-established DNN bandwidth expanding model so that the expanded bandwidth reaches the preset bandwidth, and performing time-to-frequency inverse transformation to the expanded frequency-domain bone conduction signal so as to obtain the time-domain bone conduction signal from which noise has been cancelled.

Optionally, performing a noise cancellation processing to the time-domain microphone signal by a pre-established DNN noise cancellation model so as to obtain a time-domain microphone signal from which noise has been cancelled includes:

performing a time-to-frequency transformation to the time-domain microphone signal to obtain a corresponding frequency-domain microphone signal;

extracting a first signal feature of the frequency-domain microphone signal, and processing the first signal feature by using the pre-established DNN noise cancellation model, so as to obtain first gains corresponding to first frequency points of the frequency-domain microphone signal respectively;

calculating the product of spectral signals corresponding to the first frequency points in the frequency-domain microphone signal and corresponding first gains to obtain spectral signals from which noise has been cancelled corresponding to the first frequency points respectively, so as to obtain a frequency-domain microphone signal from which noise has been cancelled; and performing a time-to-frequency inverse transformation to the frequency-domain microphone signal from which noise has been cancelled to obtain the time-domain microphone signal from which noise has been cancelled.

Optionally, determining whether the time-domain microphone signal and the time-domain bone conduction signal are voice signals includes:

performing a voice activation detection to the time-domain bone conduction signal to determine whether the time-domain bone conduction signal is a voice signal; and when the time-domain bone conduction signal is a voice signal, the time-domain microphone signal is a voice signal.

Optionally, performing a voice activation detection to the time-domain bone conduction signal to determine whether the time-domain bone conduction signal is a voice signal includes:

calculating a zero-crossing rate and a pitch period corresponding to the time-domain bone conduction signal;

performing time-to-frequency transformation to the time-domain bone conduction signal to obtain a frequency-domain bone conduction signal;

calculating a spectral energy and a spectral centroid corresponding to the frequency-domain bone conduction signal;

comprehensively determining the zero-crossing rate, the pitch period, the spectral energy and the spectral centroid to obtain a voice activation detection flag bit corresponding to the time-domain bone conduction signal; and determining whether the time-domain bone conduction signal is a voice signal according to the voice activation detection flag bit.

Optionally, comprehensively determining the zero-crossing rate, the pitch period, the spectral energy and the spectral centroid to obtain a voice activation detection flag bit corresponding to the time-domain bone conduction signal includes:

determining whether the spectrum energy is less than a first preset value, if the spectrum energy is less than the first preset value, the voice activation detection flag bit corresponding to the time-domain bone conduction signal is 0, if the spectrum energy is not less than the first preset value, proceed to a next step for determination;

determining whether the zero-crossing rate is greater than a second preset value, if the zero-crossing rate is greater than the second preset value, the voice activation detection flag bit corresponding to the time-domain bone conduction signal is 0, if the zero-crossing rate is not greater than the second preset value, proceed to a next step for determination;

determining whether the pitch period is greater than a third preset value or less than a fourth preset value, if the pitch period is greater than the third preset value or less than the fourth preset value, the voice activation detection flag bit corresponding to the time-domain bone conduction signal is 0, if the pitch period is not greater than the third preset value or less than the fourth preset value, proceed to a next step for determination;

determining whether the spectral centroid is greater than a fifth preset value, if the spectral centroid is greater than the fifth preset value, the voice activation detection flag bit corresponding to the time-domain bone conduction signal is 0, if the spectral centroid is not greater than the fifth preset value, the voice activation detection flag bit corresponding to the time-domain bone conduction signal is 1; and determining whether the time-domain bone conduction signal is a voice signal according to the voice activation detection flag bit includes:

when the voice activation detection flag bit is 1, the time-domain bone conduction signal is a voice signal; and when the voice activation detection flag bit is 0, the current time-domain bone conduction signal is a noise signal.

Optionally, obtaining an output time-domain signal at the current moment according to the first output time-domain signal and the second output time-domain signal includes:

combining the first output time-domain signal and the second output time-domain signal according to a first weight coefficient and a second weight coefficient to obtain a combined time-domain signal; and dynamically adjusting the combined time-domain signal so that the adjusted time-domain signal is within a preset range, and taking the adjusted time-domain signal as the output time-domain signal corresponding to the current time.

An embodiment of the present disclosure provides a voice enhancement apparatus, including:

an acquisition module for acquiring a time-domain microphone signal and a time-domain bone conduction signal at the current moment;

a determination module for determining whether the time-domain microphone signal and the time-domain bone conduction signal are voice signals, if the time-domain microphone signal and the time-domain bone conduction signal are voice signals, activate a noise reduction module, if the time-domain microphone signal and the time-domain bone conduction signal are not voice signals, activate a zeroing module;

the noise reduction module for performing a noise cancellation processing to the time-domain microphone signal by a pre-established DNN noise cancellation model so as to obtain a time-domain microphone signal from which noise has been cancelled, and performing a frequency-domain noise cancellation processing to the time-domain bone conduction signal so as to obtain a time-domain bone conduction signal from which noise has been cancelled;

the zeroing module configured to set an output signal at the current moment as zero;

filtering module configured for setting high-pass filtering processing to the time-domain microphone signal from which noise has been cancelled, so as to obtain a first output time-domain signal, and performing a low-pass filtering processing to the time-domain bone conduction signal from which noise has been cancelled, so as to obtain a second output time-domain signal; and a combining module for obtaining an output time-domain signal at the current moment according to the first output time-domain signal and the second output time-domain signal.

An embodiment of the present disclosure provides a voice enhancement system, including:

a memory for storing a computer program; and a processor for implementing steps of the voice enhancement method as described above when executing the computer program.

An embodiment of the present disclosure also provides a computer-readable storage medium, wherein a computer program is stored on the computer-readable storage medium, and when the computer program is executed by a processor, steps of the voice enhancement method as described above are implemented.

Embodiments of the present disclosure provide a voice enhancement method, a voice enhancement apparatus and a voice enhancement system, and a computer-readable storage medium. According to the method, by picking up the time-domain microphone signal and the time-domain bone conduction signal, and then determining whether the time-domain microphone signal and the time-domain bone conduction signal are voice signals, it may be determined whether the user is speaking at the current moment. If it is a voice signal, noise cancellation processing is performed to the time-domain microphone signal by a pre-established DNN noise cancellation model, and frequency-domain noise cancellation processing is performed to the time-domain bone conduction signal, so as to better cancel the background noise; and high-pass filtering processing is performed to the time-domain microphone signal from which noise has been cancelled to obtain a first output time-domain signal of a high-frequency part, and low-pass filtering processing is performed to the time-domain bone conduction signal from which noise has been cancelled to obtain a second output time-domain signal of a low-frequency part, and then an output time-domain signal including both the high-frequency part and the low-frequency part may be obtained according to the first output time-domain signal and the second output time-domain signal. According to the present disclosure, background noise may be better cancelled, which is benefit to improve the sound quality, and to enhance the user experience.

BRIEF DESCRIPTION OF DRAWINGS

In order to illustrate the technical solutions in the embodiments of the present disclosure more clearly, the drawings required to be used in the embodiments and the prior art will be briefly introduced in the following. Obviously, the drawings in the following description are merely some embodiments of the present disclosure, and for those skilled in the art, other drawings can also be obtained from the drawings without any creative effort.

DETAILED DESCRIPTIONS

Embodiments of the present disclosure provide a voice enhancement method, a voice enhancement apparatus, a voice enhancement system and a computer-readable storage medium, which may make the output sound signal more pleasant, improve the sound quality, and improve user experience during use.

Technical solutions of embodiments of the present disclosure will be described clearly and completely below with reference to the drawings in the embodiments of the present disclosure in order to make the objects, technical solutions and advantages of the embodiments of the present disclosure more clear. Obviously, the described embodiments are only a part of the embodiments of the present disclosure, rather than all the embodiments. Based on the embodiments in the present disclosure, all other embodiments obtained by those skilled in the art without creative efforts shall fall within the protection scope of the present disclosure.

Figure 1:
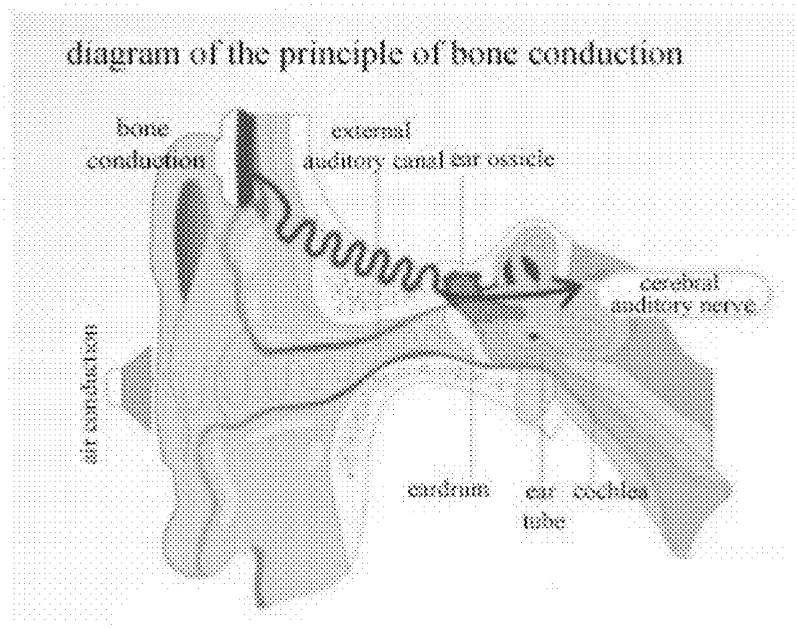
FIG. 1 is a schematic diagram of the principle of bone conduction in the prior art.
Figure 2:
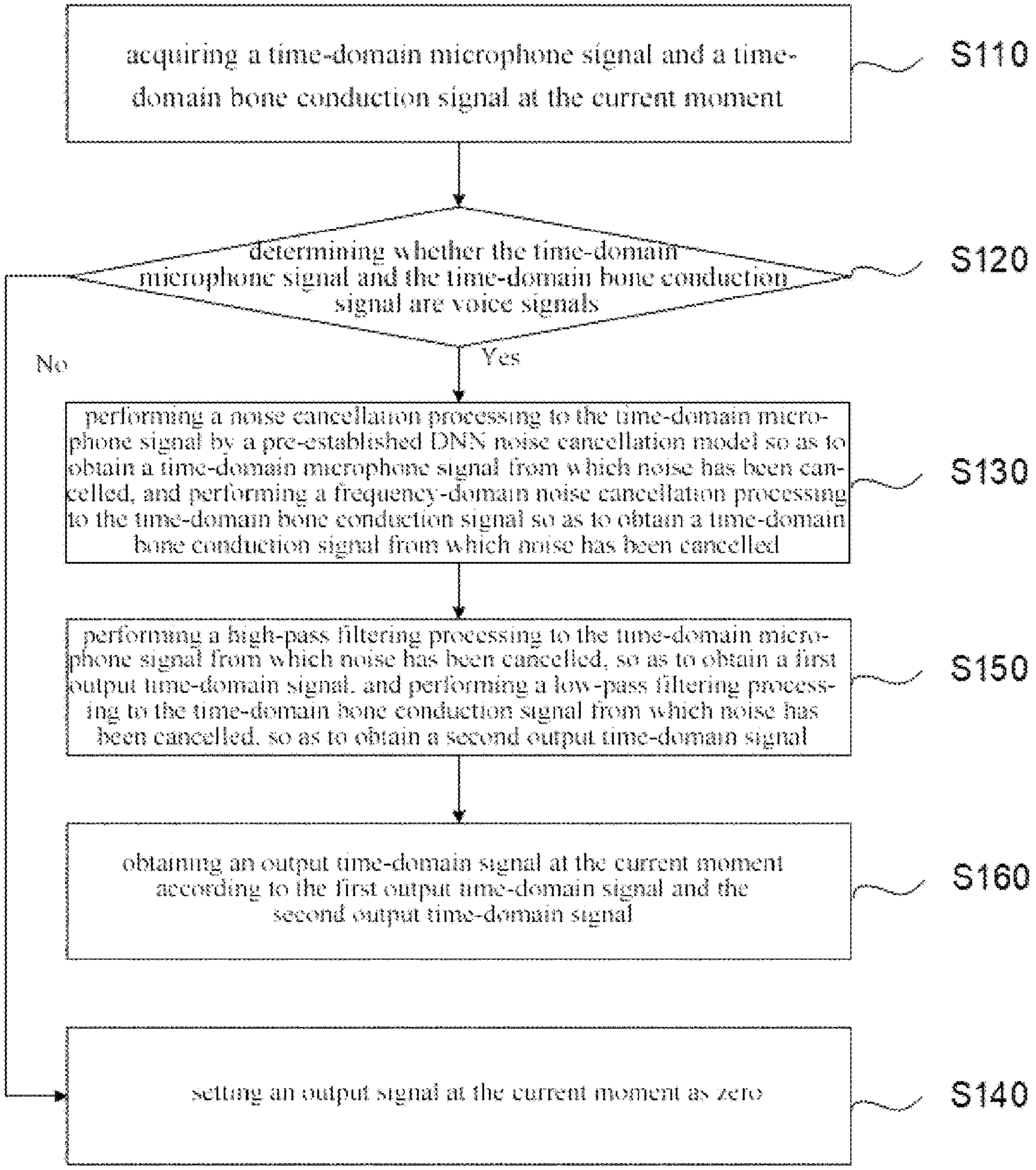
FIG. 2 is a flow diagram of a voice enhancement method provided by an embodiment of the present disclosure.

Referring to FIG. 2, FIG. 2 is a flow diagram of a voice enhancement method provided by an embodiment of the present disclosure. The method includes:

S110: acquiring a time-domain microphone signal and a time-domain bone conduction signal at the current moment.

Specifically, in practical use, the time-domain microphone signal may be picked up by a microphone, and the time-domain bone conduction signal may be collected by a bone voiceprint sensor, and the time-domain microphone signal and the time-domain bone conduction signal obtained at each moment are processed using the voice enhancement method provided in the embodiment of the present disclosure.

S120: determining whether the time-domain microphone signal and the time-domain bone conduction signal are voice signals, if yes, proceed to S130, if not, proceed to S140.

It should be noted that, after acquiring the time-domain microphone signal and the time-domain bone conduction signal at the current moment, it may be determined whether the time-domain microphone signal and the time-domain bone conduction signal are voice signals. Since the time-domain bone conduction signal can accurately reflects whether the user is currently speaking, thus by determining whether the time-domain bone conduction signal is a voice signal, it can be further determined whether the time-domain microphone signal picked up by the microphone at the current moment is a voice signal. That is, when it is determined that the time-domain bone conduction signal at the current moment is a voice signal, since the time-domain microphone signal and the time-domain bone conduction signal are signals sampled at the same time, the time-domain microphone signal at the current moment is also a voice signal. When it is determined that the time-domain bone conduction signal at the current moment is a noise signal, it means that the time-domain microphone signal at the current moment is also a noise signal.

S130: performing a noise cancellation processing to the time-domain microphone signal by a pre-established DNN noise cancellation model so as to obtain a time-domain microphone signal from which noise has been cancelled, and performing a frequency-domain noise cancellation processing to the time-domain bone conduction signal so as to obtain a time-domain bone conduction signal from which noise has been cancelled.

It should be noted that in the embodiment, in order to better cancel noise, the DNN noise cancellation model may be pre-established, and then the DNN noise cancellation model is used to perform noise cancellation processing to the time-domain microphone signal, wherein an establishment process of the DNN noise cancellation model includes:

actually recording a time-domain noise signal n' and a time-domain microphone voice signal s, calculating a mixed signal s_mix of the time-domain noise signal n' and the time-domain microphone voice signal s, and performing time-to-frequency transformation (such as FFT) to the time-domain noise signal n', the time-domain microphone voice signal s and the mixed signal s_mix respectively, the obtained frequency-domain signals are respectively N'(k), S(k) and S_mix(k), wherein k is the serial number in the frequency-domain, and then extracting feature from S_mix(k) so as to calculate a first feature parameter;

dividing the time-domain microphone voice signal s and the mixed signal s_mix into a plurality of first sub-bands (for example, 18 first sub-bands) respectively in the frequency-domain, the first sub-band may be divided by a division method of mel frequency or a division method of bark sub-band, the division method is not limited thereto and may be determined according to actual needs;

after the division is completed, calculating voice signal energy and mixed signal energy on each sub-band, wherein the voice signal energy is calculated according to $$E_s(b) = \sum_k |S(k)|^2,$$

the mixed signal energy is calculated according to $$E_{s\_mix}(b) = \sum_k |\text{S\_mix}(k)|^2,$$

wherein b represents the serial number of the sub-band, b=0, 1, . . . , 18; and then calculating a first sub-band gain, which may be specifically calculated according to $g(b)=\sqrt{E_s(b)/E_{s\_mix}(b)}$, wherein g(b) represents the gain of the bth first sub-bands.

Specifically, in the training process of the deep neural network DNN noise cancellation model, the first feature parameter of a real mixed signal obtained by the above calculation is used as an input signal, and a real first sub-band gain g obtained by the above calculation is used as an output signal. Weight coefficients W, U and bias in the deep neural network are constantly trained and adjusted so that a first gain g' of each output is constantly approaching the real first gain value g. When an error between g' and g is less than a corresponding preset value, the network training is successful, and a final DNN noise cancellation model is obtained according to network parameters at this time.

In addition, after determining whether the time-domain bone conduction signal is a voice signal and it is determined that the time-domain bone conduction signal is not a voice signal, the method may further include:

updating a power spectrum of bone conduction noise signal according to the time-domain bone conduction signal. Specifically, the time-domain bone conduction signal is converted into a frequency-domain bone conduction signal through time-to-frequency transformation, and then the power spectrum of the bone conduction noise signal may be updated according to a calculation formula $P_n(k,t)=\beta*P_n(k,t-1)+(1-\beta)*|Y(k,t)|^2$, wherein $P_n(k,t)$ represents power of a noise signal received by a bone conduction sensor at time t, $P_n(k,t-1)$ represents power of a noise signal received by the bone conduction sensor at time t−1, Y(k,t) represents the kth frequency-domain bone conduction signal at time t, k represents the serial number in the frequency-domain, β represents an iteration factor, and β may specifically be 0.9. Of course, the specific value of β may be determined according to actual needs, and is not specifically limited in the embodiment.

Correspondingly, the above-mentioned process of performing frequency-domain noise cancellation processing to the time-domain bone conduction signal so as to obtain a time-domain bone conduction signal from which noise has been cancelled may specifically be as follows:

performing noise cancellation to the frequency-domain bone conduction signal according to a calculation formula $$\hat{Y}_t(k) = Y_t(k)H_t(k) = Y_t(k)\sqrt{1-\lambda\left(\frac{1}{\gamma_t(k)}\right)},$$

so as to obtain a frequency-domain bone conduction signal from which noise has been cancelled, wherein $$\gamma_t(k) = \frac{|Y_t(k)|^2}{P_n(k,t)},$$

$Y_t(k)$ represents a spectrum signal at time t, $\hat{Y}_t(k)$ represents a spectrum signal from which noise has been cancelled, $H_t(k)$ represents a gain function, λ represents an oversubtraction factor and λ is a constant (for example, 0.9), and $\gamma_t(k)$ represents a posteriori signal-to-noise ratio.

S140: setting an output signal at the current moment as zero.

Specifically, when it is determined that the time-domain bone conduction signal at the current moment is a noise signal, the corresponding time-domain microphone signal is also a noise signal, so the output signal at the current moment may be directly set as zero.

S150: performing a high-pass filtering processing to the time-domain microphone signal from which noise has been cancelled, so as to obtain a first output time-domain signal, and performing a low-pass filtering processing to the time-domain bone conduction signal from which noise has been cancelled, so as to obtain a second output time-domain signal.

It should be noted that since there are quite a lot of high-frequency sound signals in the sound signals collected by the microphone, and low-frequency sound signals collected by the bone conduction sensor are relatively clear and complete, thus, in the embodiment of the present disclosure, a high-pass filtering processing may be performed to the time-domain microphone signal from which noise has been cancelled to obtain the first output time-domain signal of a high-frequency part, and a low-pass filtering processing may be performed to the time-domain bone conduction signal from which noise has been cancelled to obtain the second output time-domain signal of a low-frequency part.

S160: obtaining an output time-domain signal at the current moment according to the first output time-domain signal and the second output time-domain signal.

Specifically, in the present disclosure, the first output time-domain signal and the second output time-domain signal may be combined. Specifically, a first weight coefficient k1 corresponding to the first output time-domain signal and a second weight coefficient k2 corresponding to the second output time-domain signal may be determined in advance, then a combined time-domain signal is obtained by adding the first output time-domain signal and second first output time-domain signal by the respective weight coefficients. Specifically, a combined time-domain signal out may be obtained by a calculation formula out=k1*out1+k2*out2, wherein out1 is the first output time-domain signal, and out2 is the second output time-domain signal.

In addition, in order to avoid the overflow of the combined time-domain signal, the combined time-domain signal may be dynamically adjusted to compress a too large signal and to appropriately amplify a too small signal, so as to prevent the signal from overflowing, and then the adjusted time-domain signal is taken as the output time-domain signal corresponding to the current moment.

Further, performing a frequency-domain noise cancellation processing to the time-domain bone conduction signal so as to obtain a time-domain bone conduction signal from which noise has been cancelled may include:

- converting the time-domain bone conduction signal into a frequency-domain bone conduction signal through time-to-frequency transformation;
- performing a frequency-domain noise cancellation processing to the frequency-domain bone conduction signal so as to obtain a frequency-domain bone conduction signal from which noise has been cancelled; and
- determining whether a bandwidth of the frequency-domain bone conduction signal from which noise has been cancelled reaches a preset bandwidth, if yes, directly performing time-to-frequency inverse transformation to the frequency-domain bone conduction signal from which noise has been cancelled so as to obtain the time-domain bone conduction signal from which noise has been cancelled, if not, expanding the bandwidth of the frequency-domain bone conduction signal from which noise has been cancelled by using a pre-established DNN bandwidth expanding model so that the expanded bandwidth reaches the preset bandwidth, and performing time-to-frequency inverse transformation to the expanded frequency-domain bone conduction signal so as to obtain the time-domain bone conduction signal from which noise has been cancelled.

It should be noted that, after obtaining the frequency-domain bone conduction signal from which noise has been cancelled, determined whether a bandwidth of the frequency-domain bone conduction signal from which noise has been cancelled reaches a preset bandwidth (the preset bandwidth may be 1 kHz) may be further performed. If yes, time-to-frequency inverse transformation may be directly performed to the frequency-domain bone conduction signal from which noise has been cancelled so as to obtain the time-domain bone conduction signal from which noise has been cancelled. If not, the bandwidth of the frequency-domain bone conduction signal from which noise has been cancelled may be expanded by using a pre-established DNN bandwidth expanding model so that the expanded bandwidth reaches the preset bandwidth, and time-to-frequency inverse transformation may be performed to the expanded frequency-domain bone conduction signal so as to obtain the time-domain bone conduction signal from which noise has been cancelled.

Here, the establishment process of the DNN bandwidth expansion model includes:

- actually acquiring the residual bone conduction noise signal $n_g$ and bone conduction voice signal $s_g$ after noise cancellation, calculating a mixed signal $s_g$_mix of the bone conduction noise signal $n_g$ and bone conduction voice signal $s_g$, performing time-to-frequency transformation (such as FFT) to the bone conduction noise signal $n_g$, the bone conduction voice signal $s_g$ and the bone conduction mixed signal $s_g$_mix respectively, to obtain frequency-domain signals $N_g(k)$, $S_g(k)$ and $S_g$_mix(k), and then extracting feature from the $N_g(k)$, $S_g(k)$ and $S_g$_mix(k) respectively, to calculate respective second feature parameters;
- dividing the bone conduction voice signal $s_g$ and the bone conduction mixed signal $s_g$_mix into a plurality of second sub-bands (for example, five second sub-bands) respectively in the frequency-domain, the second sub-band may be divided by a division method of mel frequency or a division method of bark sub-band, the division method is not limited thereto and may be determined according to actual needs; and
- calculating bone conduction voice signal energy the bone conduction mixed signal energy on each second sub-band,
- wherein, the bone conduction voice signal energy may be calculated according to a calculation formula $$E_{sg}(b') = \sum_k |S_g(k)|^2,$$

and the bone conduction mixed signal energy may be calculated according to $$E_{s\_mix}(b') = \sum_k |\mathrm{S\_mix}(k)|^2,$$

wherein b' represents the serial number of the second sub-band, b=0, 1, . . . , 5; and then calculating a second sub-band gain, which may be specifically calculated according to $g(b')=\sqrt{E_{sg}(b')/E_{sg\_mix}(b')}$, wherein g(b') represents the gain of b'th second sub-bands.

Specifically, in the training process of the deep neural network DNN noise bandwidth expanding model, a real second sub-band feature parameter obtained by the above calculation is used as an input signal, and a real second sub-band gain g obtained by the above calculation is used as an output signal, and weight coefficients W, U and bias in the deep neural network are constantly trained and adjusted so that a second gain of each output is constantly approaching the real value. When an error between the second gain and the real value is less than a corresponding preset value, the network training is successful, and a final DNN bandwidth expanding model is obtained according to network parameters at this time.

Specifically, expanding the bandwidth of the frequency-domain bone conduction signal from which noise has been cancelled by using a pre-established DNN bandwidth expansion model may include: extracting a feature of the frequency-domain bone conduction signal to obtain the second signal feature; processing the second signal feature by using the above-mentioned pre-established DNN bandwidth expansion model so as to obtain second gains corresponding to second frequency-domain points of the frequency-domain bone conduction signal respectively;

calculating the product of spectral signals corresponding to the second frequency points in the frequency-domain bone conduction signal and corresponding second gains, to obtain spectral signals from which noise has been cancelled corresponding to the second frequency points respectively so as to obtain a frequency-domain bone conduction signal from which noise has been cancelled.

Further, performing a noise cancellation processing to the time-domain microphone signal by a pre-established DNN noise cancellation model so as to obtain a time-domain microphone signal from which noise has been cancelled may include:

performing a time-to-frequency transformation to the time-domain microphone signal to obtain a corresponding frequency-domain microphone signal;

extracting a first signal feature of the frequency-domain microphone signal, and processing the first signal feature by using the pre-established DNN noise cancellation model, so as to obtain first gains corresponding to first frequency points of the frequency-domain microphone signal respectively;

calculating the product of spectral signals corresponding to the first frequency points in the frequency-domain microphone signal and corresponding first gains to obtain spectral signals from which noise has been cancelled corresponding to the first frequency points respectively, so as to obtain a frequency-domain microphone signal from which noise has been cancelled; and performing a time-to-frequency inverse transformation to the frequency-domain microphone signal from which noise has been cancelled to obtain the time-domain microphone signal from which noise has been cancelled.

Further, determining whether the time-domain bone conduction signal is a voice signal at S120 may include:

performing a voice activation detection to the time-domain bone conduction signal to determine whether the time-domain bone conduction signal is a voice signal.

Here, performing a voice activation detection to the time-domain bone conduction signal to determine whether the time-domain bone conduction signal is a voice signal may include:

calculating a zero-crossing rate and a pitch period corresponding to the time-domain bone conduction signal;

performing time-to-frequency transformation to the time-domain bone conduction signal to obtain a frequency-domain bone conduction signal; specifically, FFT fast Fourier transform may be used to process the time-domain bone conduction signal to obtain the frequency-domain bone conduction signal;

calculating a spectral energy and a spectral centroid corresponding to the frequency-domain bone conduction signal;

comprehensively determining the zero-crossing rate, the pitch period, the spectral energy and the spectral centroid to obtain a voice activation detection flag bit corresponding to the time-domain bone conduction signal; and determining whether the time-domain bone conduction signal is a voice signal according to the voice activation detection flag bit.

Specifically, the process of calculating a zero-crossing rate corresponding to the time-domain bone conduction signal described above is as below:

calculating the zero-crossing rate corresponding to the time-domain bone conduction signal according to a first calculation relation, wherein the first calculation relation is:

$$Z_n = \sum_{m=m1}^{m2} |\mathrm{sgn}\,[x(m)] - \mathrm{sgn}\,[x(m-1)]| * w(n-m) = |\mathrm{sgn}\,[x(n)] - \mathrm{sgn}\,[x(n-1)]| * w(n),$$

wherein $Z_n$ represents the number of zero-crossing, x(m) represents the time-domain signal corresponding to the time variable m, x(m−1) represents the time-domain signal corresponding to the time variable m−1, x(n) represents the time-domain signal corresponding to the time variable n, and x(n−1) represents the time-domain signal corresponding to the time variable n−1, wherein n≤N, and N represents the length of the current time-domain signal x(n);

$$\mathrm{sgn}\,[x(n)] = \begin{cases} 1, & x(n) \geq 0 \\ -1, & x(n) < 0 \end{cases},$$

$$w(n) = \begin{cases} \frac{1}{2N}, & 0 \leq n \leq N-1 \\ 0, & N-1 < n \leq N \end{cases}$$

$$ZCR = Z_n/(m2 - m1 + 1),$$

wherein ZCR represents the zero-crossing rate, m1 represents the m1th point in the time-domain signal of the current frame, and m2 represents the m2th point in the time-domain signal of the current frame.

The process of calculating a pitch period corresponding to the time-domain bone conduction signal described above is as below:

The autocorrelation function is:

$$R_m = \sum_{n=m1}^{m2} x(n)x(n+m),$$

wherein $R_m$ represents the autocorrelation function of voice signal, x(n+m) represents the time-domain signal corresponding to the time variable n+m;

The pitch period is: Pitch=max{$R_m$}, where Pitch represents the pitch period.

The process of calculating a spectral energy corresponding to the frequency-domain bone conduction signal described above is as follows:

Specifically, for the spectrum energy of a specified bandwidth, for example, after performing FFT fast Fourier transform to the time-domain bone conduction signal, 8 kHz bandwidth is divided into 128 sub-bands, and energy of the lower 24 sub-bands is taken:

$$E_g = \log\left(\sum_{j=1}^{24} |Y(j)|^2\right),$$

wherein $E_g$ represents the logarithmic energy of the low 24 sub-bands, j represents the serial number of the low 24 sub-bands, and Y(j) represents the frequency-domain signal, wherein the low 24 sub-bands refers to 24 sub-bands taken from the 128 sub-bands in order from low frequency to high frequency.

The process of calculating a spectral centroid corresponding to the frequency-domain bone conduction signal described above is as below:

$$\text{brightness} = \frac{\sum_{k=1}^{U} f(k) * E(k)}{\sum_{k=1}^{U} E(k)},$$

$$E(k) = |Y(k)|^2$$

wherein brightness represents the spectral centroid, f(k) represents the frequency of the kth frequency point, E(k) represents the spectral energy of the kth frequency point, and U represents the number of frequency points.

Furthermore, the process of comprehensively determining the zero-crossing rate, the pitch period, the spectral energy and the spectral centroid to obtain a voice activation detection flag bit corresponding to the time-domain bone conduction signal may be specifically as follows:

determining whether the spectrum energy is less than a first preset value, if yes, the voice activation detection flag bit corresponding to the time-domain bone conduction signal is 0, if not, proceed to a next step for determination;

determining whether the zero-crossing rate is greater than a second preset value, if yes, the voice activation detection flag bit corresponding to the time-domain bone conduction signal is 0, if not, proceed to a next step for determination;

determining whether the pitch period is greater than a third preset value or less than a fourth preset value, if yes, the voice activation detection flag bit corresponding to the time-domain bone conduction signal is 0, if not, proceed to a next step for determination; and determining whether the spectral centroid is greater than a fifth preset value, if yes, the voice activation detection flag bit corresponding to the time-domain bone conduction signal is 0, if not, the voice activation detection flag bit corresponding to the time-domain bone conduction signal is 1.

It should be noted that in practical applications, the first preset value may be −9, the second preset value may be 03.6, the third preset value may be 143, the fourth preset value may be 8, and the fifth preset value may be 3. Of course, the specific numerical value of each preset value may be determined according to the actual situation, and it is not specifically limited in the embodiment.

Accordingly, determining whether the time-domain bone conduction signal is a voice signal according to the voice activation detection flag bit includes:

when the voice activation detection flag bit is 1, the time-domain bone conduction signal is a voice signal; and when the voice activation detection flag bit is 0, the current time-domain bone conduction signal is a noise signal.

Furthermore, the process of performing a noise cancellation processing to the time-domain microphone signal and the time-domain bone conduction signal in the step S130 may be specifically as follows:

performing noise cancellation processing to the time-domain microphone signal by the pre-established DNN noise cancellation model so as to obtain a time-domain microphone signal from which noise has been cancelled; and performing frequency-domain noise cancellation processing to the time-domain bone conduction signal so as to obtain a time-domain bone conduction signal from which noise has been cancelled.

It can be seen that in the embodiment of the present disclosure, by picking up the time-domain microphone signal by a microphone and collecting the time-domain bone conduction signal by a bone voiceprint sensor, and then determining whether the time-domain microphone signal and the time-domain bone conduction signal are voice signals, it may be determined whether the user is speaking at the current moment. If it is a voice signal, noise cancellation processing is performed to the time-domain microphone signal by a pre-established DNN noise cancellation model, and frequency-domain noise cancellation processing is performed to the time-domain bone conduction signal, so as to better cancel the background noise; and high-pass filtering processing is performed to the time-domain microphone signal from which noise has been cancelled to obtain a first output time-domain signal of a high-frequency part, and low-pass filtering processing is performed to the time-domain bone conduction signal from which noise has been cancelled to obtain a second output time-domain signal of a low-frequency part, and then an output time-domain signal including both the high-frequency part and the low-frequency part may be obtained according to the first output time-domain signal and the second output time-domain signal. According to the present disclosure, background noise may be better cancelled, which is benefit to improve the sound quality, and to enhance the user experience.

Figure 3:
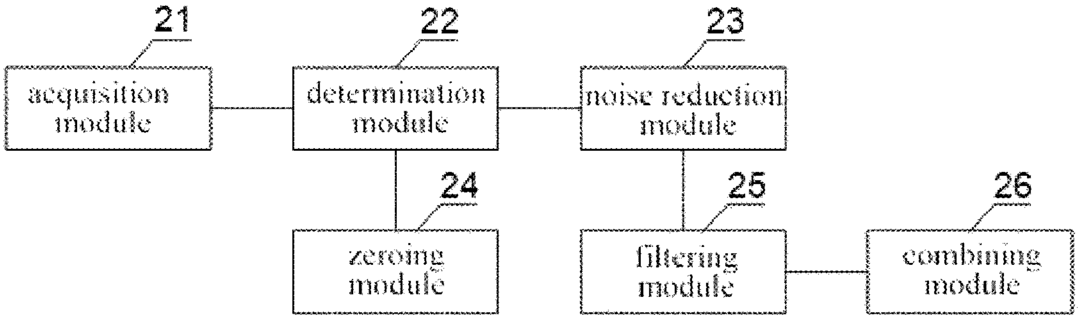
FIG. 3 is a structure diagram of a voice enhancement apparatus provided by an embodiment of the present disclosure.

On the basis of the above, an embodiment of the present disclosure also provides a voice enhancement apparatus, as shown in FIG. 3, including:

an acquisition module 21 for acquiring a time-domain microphone signal and a time-domain bone conduction signal at the current moment;

a determination module 22 for determining whether the time-domain microphone signal and the time-domain bone conduction signal are voice signals, if yes, activate a noise reduction module 23, and if not, activate a zeroing module 24;

the noise reduction module 23 configured for performing a noise cancellation processing to the time-domain microphone signal by a pre-established DNN noise cancellation model so as to obtain a time-domain microphone signal from which noise has been cancelled, and performing a frequency-domain noise cancellation processing to the time-domain bone conduction signal so as to obtain a time-domain bone conduction signal from which noise has been cancelled;

the zeroing module 24 for setting an output signal at the current moment as zero;

filtering module 25 for performing a high-pass filtering processing to the time-domain microphone signal from which noise has been cancelled, so as to obtain a first output time-domain signal, and performing a low-pass filtering processing to the time-domain bone conduction signal from which noise has been cancelled, so as to obtain a second output time-domain signal; and a combining module 26 for obtaining an output time-domain signal at the current moment according to the first output time-domain signal and the second output time-domain signal.

It should be noted that the voice enhancement apparatus provided in the embodiment of the present disclosure has the same beneficial effects as the voice enhancement method provided in the above-mentioned embodiments, and for the specific introduction of the voice enhancement method involved in the embodiment, please refer to the above embodiments, and it will not be repeated here.

On the basis of the above, an embodiment of the present disclosure also provides a voice enhancement system, including:

a memory for storing a computer program; and a processor for implementing steps of the voice enhancement method as described above when executing the computer program.

It should be noted that the processor in the embodiment of the present disclosure may be specifically used for receiving the time-domain microphone signal and the time-domain bone conduction signal at the current moment, the time-domain microphone signal is picked up by the microphone, and the time-domain bone conduction signal is collected by the bone voiceprint sensor; determining whether the time-domain microphone signal and the time-domain bone conduction signal are voice signals, if yes, performing a noise cancellation processing to the time-domain microphone signal by a pre-established DNN noise cancellation model so as to obtain a time-domain microphone signal from which noise has been cancelled, and performing a frequency-domain noise cancellation processing to the time-domain bone conduction signal so as to obtain a time-domain bone conduction signal from which noise has been cancelled, if not, setting an output signal at the current moment as zero; performing a high-pass filtering processing to the time-domain microphone signal from which noise has been cancelled, so as to obtain a first output time-domain signal, and performing a low-pass filtering processing to the time-domain bone conduction signal from which noise has been cancelled, so as to obtain a second output time-domain signal; and obtaining an output time-domain signal at the current moment according to the first output time-domain signal and the second output time-domain signal.

On the basis of the above, an embodiment of the present disclosure also provides a computer-readable storage medium, wherein a computer program is stored on the computer-readable storage medium, and when the computer program is executed by a processor, steps of the voice enhancement method as described above are implemented.

The computer-readable storage medium may include various media that can store program codes such as U disk, mobile hard disk, Read-Only Memory (ROM), Random Access Memory (RAM), magnetic disk, optical disk, and the like.

The various embodiments in this specification are described in a progressive manner, and each embodiment focuses on the differences from other embodiments, and the same or similar parts between the various embodiments may be referred to each other. As for the apparatus disclosed in the embodiment, since it corresponds to the method disclosed in the embodiment, the description is relatively simple. For relevant parts, please refer to the description of the method.

It should be noted that relational terms such as first and second described herein are only used to distinguish one entity or operation from another entity or operation, and do not necessarily require or imply any such actual relationship or order between these entities or operations. Moreover, terms such as "comprise", "include" or any other variation thereof are intended to encompass a non-exclusive inclusion such that a process, method, article or apparatus that includes a series of elements includes not only those elements, but also other elements not explicitly listed, or elements inherent to such a process, method, article or apparatus. Without further limitation, the element defined by the phrase "comprising a . . . " does not preclude the presence of additional identical elements in the process, method, article or apparatus including the element.

The above explanation of the disclosed embodiments enables those skilled in the art to implement or use the present invention. Various modifications to these embodiments will be apparent to those skilled in the art, and the general principles defined herein can be implemented in other embodiments without departing from the spirit or scope of the present disclosure. Therefore, the present disclosure will not be limited to the embodiments described in the disclosure, but rather to the widest range consistent with the principles and novel features disclosed herein.

What is claimed is:

1. A voice enhancement method, comprising:

acquiring a time-domain microphone signal and a time-domain bone conduction signal at the current moment;

determining whether the time-domain microphone signal and the time-domain bone conduction signal are voice signals, if the time-domain microphone signal and the time-domain bone conduction signal are voice signals, performing a noise cancellation processing to the time-domain microphone signal by a pre-established DNN noise cancellation model so as to obtain a time-domain microphone signal from which noise has been cancelled, and performing a frequency-domain noise cancellation processing to the time-domain bone conduction signal so as to obtain a time-domain bone conduction signal from which noise has been cancelled, if the time-domain microphone signal and the time-domain bone conduction signal are not voice signals, setting an output signal at the current moment as zero;

performing a high-pass filtering processing to the time-domain microphone signal from which noise has been cancelled, so as to obtain a first output time-domain signal, and performing a low-pass filtering processing to the time-domain bone conduction signal from which noise has been cancelled, so as to obtain a second output time-domain signal; and obtaining an output time-domain signal at the current moment according to the first output time-domain signal and the second output time-domain signal.

2. The voice enhancement method of claim 1, wherein performing a frequency-domain noise cancellation processing to the time-domain bone conduction signal, so as to obtain a time-domain bone conduction signal from which noise has been cancelled comprises:

converting the time-domain bone conduction signal into a frequency-domain bone conduction signal through time-to-frequency transformation;

performing a frequency-domain noise cancellation processing to the frequency-domain bone conduction signal so as to obtain a frequency-domain bone conduction signal from which noise has been cancelled; and determining whether a bandwidth of the frequency-domain bone conduction signal from which noise has been cancelled reaches a preset bandwidth, if the bandwidth of the frequency-domain bone conduction signal from which noise has been cancelled reaches the preset bandwidth, directly performing frequency-to-time inverse transformation to the frequency-domain bone conduction signal from which noise has been cancelled so as to obtain the time-domain bone conduction signal from which noise has been cancelled, if the bandwidth of the frequency-domain bone conduction signal from which noise has been cancelled does not reach the preset bandwidth, expanding the bandwidth of the frequency-domain bone conduction signal from which noise has been cancelled by using a pre-established DNN bandwidth expanding model so that the expanded bandwidth reaches the preset bandwidth, and performing frequency-to-time transformation to the expanded frequency-domain bone conduction signal so as to obtain the time-domain bone conduction signal from which noise has been cancelled.

3. The voice enhancement method of claim 1, wherein performing a noise cancellation processing to the time-domain microphone signal by a pre-established DNN noise cancellation model so as to obtain a time-domain microphone signal from which noise has been cancelled comprises:

performing a time-to-frequency transformation to the time-domain microphone signal to obtain a corresponding frequency-domain microphone signal;

extracting a first signal feature of the frequency-domain microphone signal, and processing the first signal feature by using the pre-established DNN noise cancellation model, so as to obtain first gains corresponding to first frequency points of the frequency-domain microphone signal respectively;

calculating the product of spectral signals corresponding to the first frequency points in the frequency-domain microphone signal and corresponding first gains, to obtain spectral signals from which noise has been cancelled corresponding to the first frequency points respectively, so as to obtain a frequency-domain microphone signal from which noise has been cancelled; and performing a frequency-to-time transformation to the frequency-domain microphone signal from which noise has been cancelled to obtain the time-domain microphone signal from which noise has been cancelled.

4. The voice enhancement method of claim 1, wherein determining whether the time-domain microphone signal and the time-domain bone conduction signal are voice signals comprises:

performing a voice activation detection to the time-domain bone conduction signal to determine whether the time-domain bone conduction signal is a voice signal; and when the time-domain bone conduction signal is a voice signal, the time-domain microphone signal is a voice signal.

5. The voice enhancement method of claim 4, wherein performing a voice activation detection to the time-domain bone conduction signal to determine whether the time-domain bone conduction signal is a voice signal comprises:

calculating a zero-crossing rate and a pitch period corresponding to the time-domain bone conduction signal;

performing time-to-frequency transformation to the time-domain bone conduction signal to obtain a frequency-domain bone conduction signal;

calculating a spectral energy and a spectral centroid corresponding to the frequency-domain bone conduction signal;

comprehensively determining the zero-crossing rate, the pitch period, the spectral energy and the spectral centroid to obtain a voice activation detection flag bit corresponding to the time-domain bone conduction signal; and determining whether the time-domain bone conduction signal is a voice signal according to the voice activation detection flag bit.

6. The voice enhancement method of claim 5, wherein comprehensively determining the zero-crossing rate, the pitch period, the spectral energy and the spectral centroid to obtain a voice activation detection flag bit corresponding to the time-domain bone conduction signal comprises:

determining whether the spectrum energy is less than a first preset value, if the spectrum energy is less than the first preset value, the voice activation detection flag bit corresponding to the time-domain bone conduction signal is 0, if the spectrum energy is not less than the first preset value, proceed to a next step for determination;

determining whether the zero-crossing rate is greater than a second preset value, if the zero-crossing rate is greater than the second preset value, the voice activation detection flag bit corresponding to the time-domain bone conduction signal is 0, if the zero-crossing rate is not greater than the second preset value, proceed to a next step for determination;

determining whether the pitch period is greater than a third preset value or less than a fourth preset value, if the pitch period is greater than the third preset value or less than the fourth preset value, the voice activation detection flag bit corresponding to the time-domain bone conduction signal is 0, if the pitch period is not greater than the third preset value and not less than the fourth preset value, proceed to a next step for determination;

determining whether the spectral centroid is greater than a fifth preset value, if the spectral centroid is greater than the fifth preset value, the voice activation detection flag bit corresponding to the time-domain bone conduction signal is 0, if the spectral centroid is not greater than the fifth preset value, the voice activation detection flag bit corresponding to the time-domain bone conduction signal is 1; and determining whether the time-domain bone conduction signal is a voice signal according to the voice activation detection flag bit comprises:

when the voice activation detection flag bit is 1, the time-domain bone conduction signal is a voice signal; and when the voice activation detection flag bit is 0, the current time-domain bone conduction signal is a noise signal.

7. The voice enhancement method of claim 1, wherein obtaining an output time-domain signal at the current moment according to the first output time-domain signal and the second output time-domain signal comprises:

combining the first output time-domain signal and the second output time-domain signal according to a first weight coefficient and a second weight coefficient to obtain a combined time-domain signal; and dynamically adjusting the combined time-domain signal so that the adjusted time-domain signal is within a preset range, and taking the adjusted time-domain signal as the output time-domain signal corresponding to the current time.

8. A voice enhancement apparatus, comprising:

an acquisition module for acquiring a time-domain microphone signal and a time-domain bone conduction signal at the current moment;

a determination module for determining whether the time-domain microphone signal and the time-domain bone conduction signal are voice signals, if the time-domain microphone signal and the time-domain bone conduction signal are voice signals, activate a noise reduction module, if the time-domain microphone signal and the time-domain bone conduction signal are not voice signals, activate a zeroing module;

the noise reduction module for performing a noise cancellation processing to the time-domain microphone signal by a pre-established DNN noise cancellation model so as to obtain a time-domain microphone signal from which noise has been cancelled, and performing a frequency-domain noise cancellation processing to the time-domain bone conduction signal so as to obtain a time-domain bone conduction signal from which noise has been cancelled;

the zeroing module for setting an output signal at the current moment as zero;

a filtering module for performing a high-pass filtering processing to the time-domain microphone signal from which noise has been cancelled, so as to obtain a first output time-domain signal, and performing a low-pass filtering processing to the time-domain bone conduction signal from which noise has been cancelled, so as to obtain a second output time-domain signal; and a combining module for obtaining an output time-domain signal at the current moment according to the first output time-domain signal and the second output time-domain signal.

9. A voice enhancement system, comprising:

a memory for storing a computer program; and a processor for implementing steps of the voice enhancement method of claim 1 when executing the computer program.

10. A Non-transitory computer-readable storage medium, wherein a computer program is stored on the computer-readable storage medium, and when the computer program is executed by a processor, steps of the voice enhancement method of claim 1 are implemented.

* * * * *